(12) United States Patent
Jones

(10) Patent No.: US 10,116,608 B2
(45) Date of Patent: Oct. 30, 2018

(54) EMAIL DEAL ALERTER THROUGH DATA SCRAPING

(71) Applicant: PAYPAL, INC., San Jose, CA (US)

(72) Inventor: Ashley Victoria Jones, El Sobrante, CA (US)

(73) Assignee: PAYPAL, INC., San Jose, CA (US)

( * ) Notice: Subject to any disclaimer, the term of this patent is extended or adjusted under 35 U.S.C. 154(b) by 397 days.

(21) Appl. No.: 14/869,848

(22) Filed: Sep. 29, 2015

(65) Prior Publication Data

US 2017/0093778 A1    Mar. 30, 2017

(51) Int. Cl.
*G06F 15/16*     (2006.01)
*H04L 12/58*     (2006.01)
*H04L 29/08*     (2006.01)

(52) U.S. Cl.
CPC .............. *H04L 51/18* (2013.01); *H04L 67/02* (2013.01)

(58) Field of Classification Search
CPC ........................................................ H04L 67/02
USPC ........................................ 709/206, 200, 217
See application file for complete search history.

(56) References Cited

U.S. PATENT DOCUMENTS

| | | | |
|---|---|---|---|
| 2002/0169650 A1* | 11/2002 | Dougherty | G06Q 30/02 705/38 |
| 2013/0268315 A1* | 10/2013 | Cotton | G06Q 30/0201 705/7.29 |
| 2015/0100437 A1 | 4/2015 | Guo et al. | |

* cited by examiner

*Primary Examiner* — El Hadji Sall
(74) *Attorney, Agent, or Firm* — Haynes and Boone, LLP

(57) ABSTRACT

Systems and methods for alerting a user of deal emails are provided. Emails that contain deals are analyzed to determine which emails will be expiring soon and are of interest to a user. Deal alerts containing hyperlinks to relevant deal emails are sent to the user, and the user can view the deals by clicking on the hyperlinks. If the user decides to delete the deal alert, the deal email is deleted from the user's inbox as well.

20 Claims, 3 Drawing Sheets

EMAIL DEAL ALERTER THROUGH DATA SCRAPING

BACKGROUND

Field of the Invention

The present invention generally relates to notifying a user of commercial deals and offers received in emails. In particular, the present invention relates to sending a notification to a user with the most relevant commercial deals and offers based on scraping of electronic data.

Related Art

Marketing communications are frequently sent by email to consumers. Unfortunately, a consumer's email inbox may receive many emails from marketers that are spam as well as requested marketing communications with offers that are relevant to that individual consumer. Consumers can receive a large numbers of emails from retailers that they are interested in, where many of the emails include commercial deals and offers that will expire in the near future.

Users can spend a significant amount of time reviewing each of these received emails in the hopes that they will find a relevant deal, or they may decide to delete the emails without reviewing them. If a user does not make it a habit to view his or her email inbox and delete messages, the user can end up with hundreds of unnecessary and unread messages. In addition, the deals that the user is truly interested in may be lost.

Accordingly, a need exists for systems and methods that alert a user to the most relevant deals in his or her emails.

Figure 1:
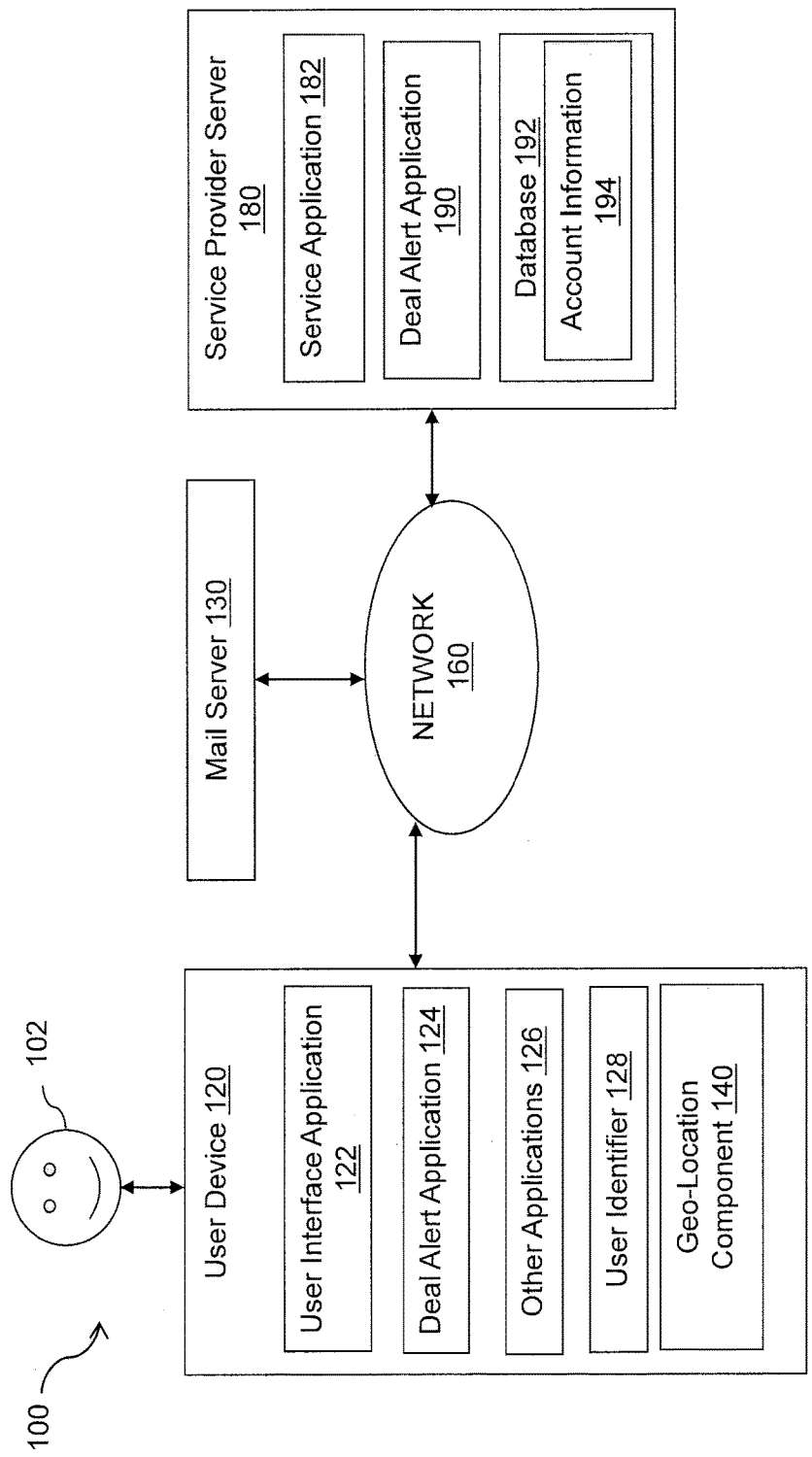
FIG. 1 is a block diagram illustrating a system for alerting a user of deal emails according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods that intelligently scan emails for deals that will be expiring soon and extract the deal emails (i.e., emails associated with one or more deals) that a user may be most interested in. For example, a deal email may be an email containing, having content related to, or announcing a coupon, a promotion, a discount, or sale. In one embodiment, the user is alerted about deals based on the user's recent purchases and/or favorite retailer. The deals may be based on a complementary product to the user's recent purchase.

The described systems and methods flexibly allow an online consumer to easily discover relevant offers in their email inbox for products or services they want and brands they like. As used herein, an offer or deal means any online promotion for goods or services, including without limitation, coupons, discounts, gift cards, points, rewards, rebates, points, vouchers, and the like. By ranking deals and transmitting only the most relevant ones to the user, the present systems and methods benefit both the user and the merchant. The user benefits because the user can take advantage of the deals before they expire, and the merchant benefits because of greater acceptance of deals by the users.

In some embodiments, a deal alert (e.g., a text message) is provided to a user on a mobile device. In other embodiments, the deal alert is displayed on a service provider homepage of the user. The user may indicate a preference for a frequency at which the deal alert is to be sent to the user. The deal alert typically includes a one-liner or short message such as "here are your daily deals" or "here are your recent deals," and includes one or more hyperlink(s) to one or more deal emails. When the user clicks on a hyperlink to a deal email, the user is transported directly to the deal email containing the relevant deal, where the user can take advantage of the deal and check out. The deal email can be automatically deleted once the user uses the deal. In certain embodiments, a user can forward the deal alert to his or her friends or share the deal alert via email, text, and/or social messaging before the deals expire. In one embodiment, the deal emails may be automatically forwarded to friends of the user, for example, when the user, indicates that he or she is not interested in the deal (e.g., deleting the deal alert containing the deal email or deleting the deal email).

In various embodiments, the user decides that he or she is not interested in any of the deals in the deal alert and deletes the deal alert. This action is duplicated in the user's email account as well. When the user deletes the deal alert, the deal emails in the deal alert are automatically deleted from the user's email inbox, marked as read, or placed in a spam-type folder. In other embodiments, expired deal emails are automatically deleted from the user's email inbox, are tagged for deletion, or are suggested for deletion (e.g., placed in a spam-type folder).

For example, Mary receives an email from Retailer X with a deal on cell phone accessories that expires at midnight. A service provider knows that Mary recently purchased a cell phone from Retailer X and triggers a text message to Mary with a hyperlink to the deal email. In one scenario, Mary views the deal, purchases the discounted cell phone accessories, pays using the service provider, and the deal email is deleted from her email inbox. In a second scenario, Mary views the deal, does not make a purchase, and after the deal expires, the deal email is deleted (or tagged for suggested deletion). In a third scenario, Mary knows that her friends are eligible for the deal and shares the deal via email, text, and/or social messaging before the deal expires.

As such, embodiments described herein address problems created by technology through a solution rooted in computer technology. In particular, the problem of excessive emails and spam emails in a user's inbox are created by technology and requires additional storage capacity and management resources. The solutions to these problems are rooted in computer technology and are directed to methods of addressing specific problems associated with emails. For example, automatically deleting a deal email when a message (not the email) associated with the deal email is deleted is not conventional. The present disclosure manipulates the interaction between a user device and a mail server by deleting the deal email from a user inbox supported by a mail server when the user deletes the message on the user device. The emails can alternatively be marked as read, or placed in a spam-type folder, which is also unconventional.

FIG. 1 shows one embodiment of a block diagram of a network-based system 100 that is configured to alert a user of deal emails according to an embodiment of the present disclosure. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 100 includes a user device 120 (e.g., a smartphone), a mail server 130, and at least one service provider server or device 180 (e.g., network server device) in communication over a network 160. Network 160, in one embodiment, may be implemented as a single network or a combination of multiple networks. For example, in various embodiments, network 160 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet.

User device 120, in one embodiment, is utilized by a user 102 to interact with service provider server 180 over network 160. User device 120, in various embodiments, may be implemented using any appropriate combination of hardware and/or software configured for wired and/or wireless communication over network 160. In various implementations, user device 120 may include at least one of a smartphone, wireless cellular phone, satellite phone, tablet (e.g., iPad™ from Apple®), laptop computer, wearable device (e.g., smart watch or Google Glass), notebook computer, hybrid/convertible computer, personal computer (PC), and/or other types of computing devices.

User device 120, in one embodiment, includes a user interface application 122, which may be utilized by user 102 to access applications and to provide instructions to service provider server 180 over network 160. In one aspect, user 102 may login to an account related to user 102 via user interface application 122.

In one implementation, user interface application 122 comprises a software program, such as a graphical user interface (GUI), executable by a processor that is configured to interface and communicate with service provider server 180 via network 160. In another implementation, user interface application 122 comprises a browser module that provides a network interface to browse information available over network 160. For example, user interface application 122 may be implemented, in part, as a web browser to view information available over network 160.

User device 120, in several embodiments, includes a deal alert application 124, which provides the user 120 with the most relevant deals. Deal alert application 124 may be developed by a service provider. Deal alert application 124 may be downloaded to user device 120 from an app store and/or from a service provider website and installed on user device 120. The deal alert application 124 may display the most relevant deals to the user 102, such as on an interactive or touch screen display, once the user 102 logs in or otherwise accesses an account of the user 102 with the service provider.

The deal alert application 124 may comprise or be implemented by one or more hardware components, software components, firmware components, and/or combination thereof. For example, the deal alert application 124 may be implemented by a computer program stored on one or more types of computer-readable storage media to be executed by one or more processors of the user device 120.

Deal alert application 124, in some embodiments, may check, scan, or otherwise scrape emails of the user 102 for relevant deals. Deal alert application 124 knows what the user 102 has purchased and what the user 102 has been searching for, for example, on retail sites such as amazon.com, walmart.com, target.com, bestbuy.com, and kmart.com. Based on the user's purchases and what the user 102 has been searching for, deal alert application 124 can provide and/or display the most relevant deals to the user 102 on user device 120. Deal alert application 124, in various embodiments, includes an auto-delete function for deal emails that have expired or have been used, or that the user 102 has indicated he or she is not interested in.

User device 120, in various embodiments, may include other applications 126 as may be desired in one or more embodiments of the present disclosure to provide additional features available to user 102. In one example, such other applications 126 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, other applications 126 may interface with user interface application 122 for improved efficiency and convenience.

User device 120, in one embodiment, may include at least one user identifier 128, which may be implemented, for example, as operating system registry entries, cookies associated with user interface application 122, identifiers associated with hardware of user device 120, or various other appropriate identifiers. User identifier 128 may include one or more attributes related to user 102, such as personal information related to user 102 (e.g., one or more user names, passwords, photograph images, biometric IDs, addresses, phone numbers, social security number, etc.). In various implementations, user identifier 128 may be passed with a user login request to service provider server 180 via network 160, and user identifier 128 may be used by service provider server 180 to associate user 102 with a particular user account maintained by service provider server 180.

User device 120, in various embodiments, includes a geo-location component 140 (e.g., GPS receiver) configured to determine, track, monitor, and/or provide an instant geographical location of time display device 120. User device 120 can determine a current location of user device 120 using various location determination techniques. For example, user device 120 can determine a current location using a Global Positioning System (GPS) signal, by triangulating positions of wireless access points, or by a current cell identifier of a cellular communications network.

In one implementation, the geographical location may include GPS coordinates, zip-code information, area-code information, street address information, and/or various other generally known types of location information. In one example, the location information may be directly entered into user device 120 by user 102 via a user input component, such as a keyboard, touch display, and/or voice recognition microphone. In another example, the location information may be automatically obtained and/or provided by the user device 120 via an internal or external monitoring component that utilizes a GPS, which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using user device 120 via a check-in device at a location, such as a beacon. This helps to save battery life and to allow for better indoor location where GPS typically does not work.

Mail server 130, in various embodiments, is maintained by an email service provider, such as Google®, Yahoo®, or Microsoft®, and is configured to manage email accounts for users. Mail server 130 may receive emails, including emails containing deals. Each email may include a header and a body, and may contain plain text, HTML (hypertext markup language), or other form of content. Mail server 130 may store emails in accounts for users, and may enable the users to access the stored emails to read them. Mail server 130 may organize emails in an email database. In various embodiments, mail server 130 forwards emails to service provider server 180.

Service provider server 180, in various embodiments, may be maintained by a service provider that provides online services and/or processing for information transactions. As such, service provider server 180 includes a service application 182, which may be adapted to interact with the user device 120 over the network 160 to facilitate the receipt and analysis of information from user device 120. In one example, service provider server 180 may be provided by a service provider such as PayPal®, Inc. of San Jose, Calif., USA. Service provider server 180, in an embodiment, receives emails from mail server 130.

Service provider server 180, in one embodiment, may be configured to maintain one or more user accounts in database 192, each of which may include account information 194 associated with one or more individual users (e.g., user 102) and merchants. For example, account information 194 may include private financial information of user 102 and merchants, such as one or more account numbers, passwords, credit card information, banking information, or other types of financial information, which may be used to facilitate financial transactions between user 102, and one or more merchants. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, service provider server 180 includes a deal alert application 190. Deal alert application 190 manages emails containing deals for user 102. For instance, deal alert application 190 determines which emails contain a deal, and output those deal emails to user 102. For example, deal alert application 190 may transmit a deal alert to user device 120, or may display the deal alert on a service provider homepage of the user 102.

Figure 2:
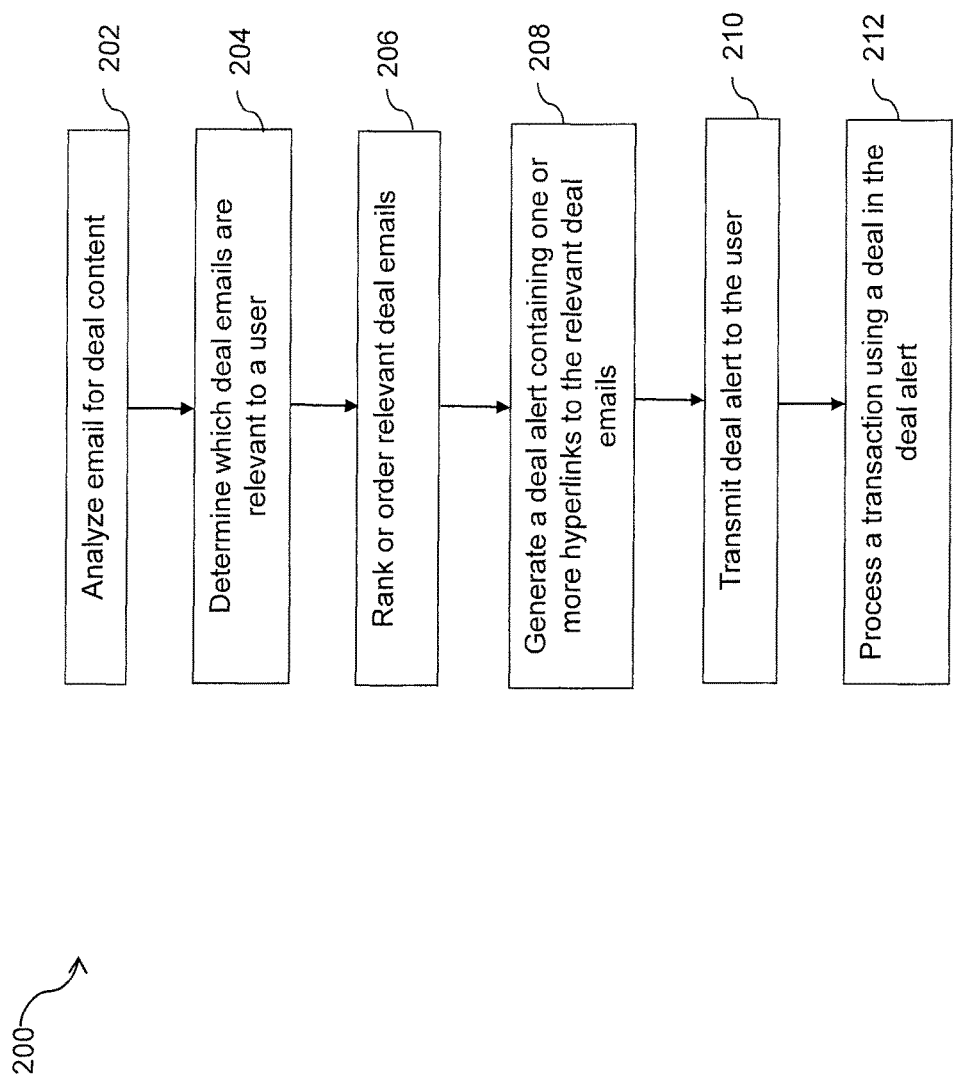
FIG. 2 is a flowchart showing a method of alerting a user of deal emails according to an embodiment of the present disclosure.

Referring now to FIG. 2, a flowchart of a method 200 of alerting a user to deal emails is illustrated according to an embodiment of the present disclosure. While the method 200 is described with regards to service provider server 180, it should be understood that deal application 124 can perform the method 200 as well.

At step 202, the service provider server 180 analyzes each email that is received by the mail server for deal content to determine whether the email contains a deal (which can include an offer, a sale or special pricing, or other incentivizing content). In various embodiments, the service provider server 180 receives or accesses emails from the mail server 130. The service provider server 180 may use any suitable criteria to determine whether a received email includes a deal. For example, the service provider server may analyze the email header and email body of each email for indications of a deal. The email header and/or email body may include contents that indicate that the email is from a commercial entity or retailer such as "deal," "daily deal," "offer," "% off," "savings," "clearance," etc. The service provider server 180 can analyze the sender address to determine if it corresponds to a sender known for emailing deals, such as Amazon or Groupon.

At step 204, from the emails that contain a deal, the service provider server 180 determines which emails are relevant to the user 102. Relevance of emails can be determined based on various factors, including but not limited to expiration date, purchase history, searches, location, interests, hobbies, forms of payment accepted (e.g., if the merchant offering the deal accepts payments for the service provider), the amount of the discount, and wish lists or shopping lists. For example, only those deals that can be used at a location proximate to user 102 may be deemed relevant. In some embodiments, the user 102's location is determined and deals that are within a certain proximity of the user 102 are classified as relevant. In another example, deals that have already expired are classified as irrelevant.

In certain embodiments, the service provider scans or scrapes a user's inbox including, the sent folder, draft folder, trash folder, spam folder, and other folders to determine relevancy of an email. For example, if an email in the inbox has been read, it may not be as relevant as one that has not been read. If an email has been forwarded (in a sent folder), it may not be as relevant as one that is in the trash folder because the user may have accidentally deleted the email. If an email is in a spam folder, it may be more relevant as it means the user may not have seen it.

In various embodiments, the service provider server 180 analyzes the purchase history of the user 102, including product categories, brand names, specific product identifiers, styles, sizes, colors, prices, etc. If the user 102 previously bought an item in a product category with a specific brand name, the server 180 may determine that the user 102 has a brand preference. The user 102's purchase history can be extended to predict shopping preferences of the user 102 such as what kinds of products the user 102 typically purchases (e.g., clothes or electronics), brand loyalty, merchant loyalty, and frugality (e.g., the user 102 usually purchases the lowest cost option or items on sale).

Moreover, the server 180 can analyze the user 102's past purchases to determine products that are complementary to the purchased products. For example, if the user 102 recently bought a computer, the user 102 may be interested in a printer to accompany the new computer.

In another embodiment, the service provider server 180 examines what the user 102 has bought in the past and analyzes what other shoppers who bought similar items viewed or purchased. For example, assume the user 102 bought a collared crewneck sweater. The server 180 determines that other shoppers who bought that same collared crewneck sweater or a collared crewneck sweater in the same style also bought a pencil skirt together with the crewneck sweater. The server 180 can predict that the user 102 is likely to be interested in a pencil skirt and alert the user 102 of a deal email for a pencil skirt.

With a large amount of shopping data, the server 180 can piece or combine attributes or characteristic of items together to determine if a deal is relevant to the user 102. For example, the server 180 may determine that the user 102 likes the color green because the user 102 recently bought a green t-shirt, green plates, and green phone cover. The server 180 also determines that the user 102 enjoys baking because the user 102 has purchased baking pans, cupcake pans, oven mitts, cupcake holders, and cookie cutters. If there is a deal email for a discount on a green KitchenAid® mixer, the server 180 may consider the deal email especially relevant (or of higher relevance than a non-green mixer) to the user 102.

In one embodiment, the server 180 analyzes what shoppers in the user 102's social network have bought and protects the user 102 from purchasing an identical item. As such, even though an item may otherwise be relevant to a user 102 (e.g., on a wish list, desired color, desired brand, etc.), the deal email containing the item would not be considered relevant if the server 180 determines that the user 102 may not want to purchase the item because a friend or contact of the user 102 purchased the same or similar item. The server 180, however, can look for deals on items that are similar in style, color, or design to the item.

At step 206, once the relevant deal emails are determined, the service provider server 180 ranks or orders the deal emails to generate a list of the most relevant deals. In various embodiments, the ranking is based on user preferences, expiration dates, deal quality, user location, wish lists, or a combination thereof. For example, the deals with the most imminent expiration dates may be ranked ahead of deals with later expiration dates, the deals for products or services on a wish list may be ranked ahead deals not on the wish list, and/or the deals that may be used at physical locations closer to the user 102 may be ranked ahead of deals that may be used at physical locations that are farther away. In several embodiments, only the top three deals are determined.

At step 208, the service provider server 180 generates a deal alert that contains a short message and one or more hyperlinks to the relevant deal emails. The deal alert may be in the form of a text message or a display on the user's homepage with a service provider that the user 102 sees when he or she logs into the homepage. For example, the deal alert may contain a message such as "Here are your deals!" and a hyperlink to each deal email that the server 180 determined to be relevant (e.g., for three deal emails, three hyperlinks). The hyperlinks may be ranked according to relevancy, with the most relevant deal email's hyperlink at the top, or in the most prominent position. In some embodiments, the top three hyperlinks are highlighted or are larger than the other hyperlinks to draw user 102's attention.

At step 210, the service provider server 180 transmits the deal alert to the user 102. In one embodiment, the deal alert is transmitted in the form of a text message and presented on a display of a user device 120 (e.g., a mobile device) of the user 102. In another embodiment, the deal alert is transmitted to an account of the user 102 with the service provider and displayed on the user's homepage with the service provider. In this way, the deals are not always being pushed to the user 102, but may be viewed when the user 102 accesses his account with the service provider.

In certain embodiments, service provider server 180 may cause user device 120 to light up or make a sound to gain the user 102's attention that a new deal alert is available for viewing. For example, user device 120 may vibrate, or start playing a specific song, ringtone, or sound effect when a new deal alert is sent. The user device 120 or a light on the user device 120 may light up or flash when a new deal alert is transmitted. In some embodiments, the vibration, sound, and/or light continue until user 102 accesses the deal alert.

In some embodiments, the user 102 selects one of the hyperlinks in the deal alert and is transported to the email containing the deal. The user 102 decides to purchase the product or service associated with the deal and checks out using a service provider account. The deal email may be automatically deleted from the user 102's inbox once the user 102 checks out.

At step 212, the service provider server 180 processes the transaction. The processing may include debiting the appropriate amount of funds (taking the deal into account) from a user account and crediting the appropriate amount to a merchant.

In various embodiments, the user 102 views the deal email and does not make a purchase. After the deal expires, the deal email is automatically deleted from the user 102's email inbox. In some embodiments, the deal email is automatically deleted only after all the deals in the deal email expire (e.g., the deal email may contain more than one deal with different expiration dates). In other embodiments, the deal emails may be automatically forwarded to friends (e.g., contacts in the user 102's email address book) of the user 102. For example, when the user 102 indicates that he or she is not interested in the deal (e.g., deleting the deal alert containing the deal email or deleting the deal email), the deal email can be forwarded. In some embodiments, user 102 may specify to the service provider which friends should be alerted for which deals. For example, Friend A may be interested in deals for electronics and Friend B may be interested in deals related to pets (e.g., pet food, pet pampering, etc.). User 102 may instruct the service provider to forward deal emails for electronics to Friend A and deal emails related to pets to Friend B. In some embodiments, the service provider may already know Friend A and Friend B's interests because they each have an account with the service provider.

Figure 3:
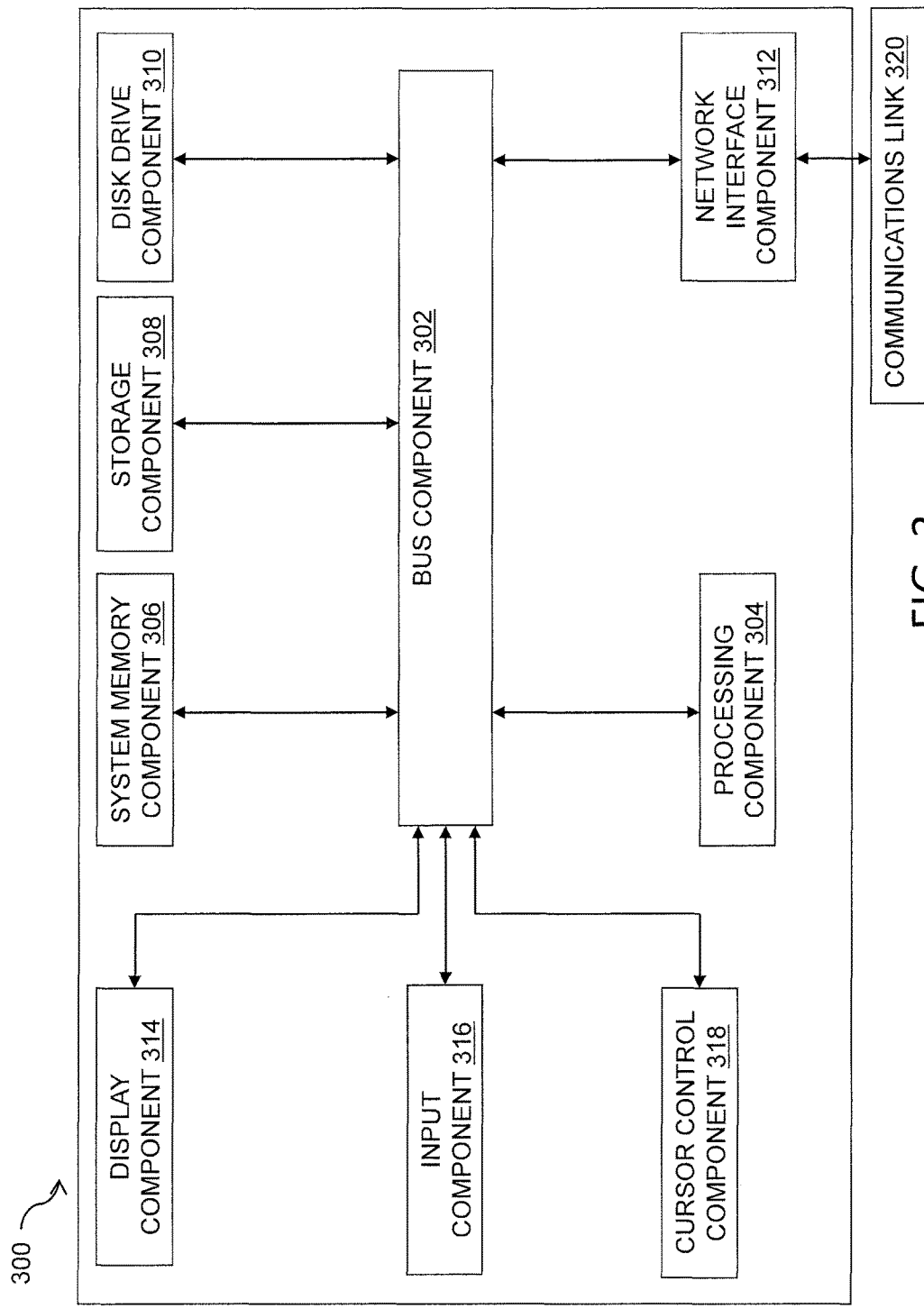
FIG. 3 is a block diagram of a system for implementing one or more components in FIG. 1 according to an embodiment of the present disclosure.

Referring now to FIG. 3, a block diagram of a system 300 is illustrated suitable for implementing embodiments of the present disclosure, including user device 120, mail server 130, and service provider server or device 180. System 300, such as part of a cell phone, a tablet, a personal computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), and a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. In other embodiments, hardwired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching, auto-synchronizing, storing access control information, making payments, or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods and systems have been described according to one or more embodiments for alerting a user to deal emails.

Although various components and steps have been described herein as being associated with user device 120, mail server 130, and service provider server or device 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system for alerting a user of emails containing a deal, comprising:
   a non-transitory memory; and
   one or more hardware processors coupled to the non-transitory memory and configured to read instructions from the non-transitory memory to cause the system to perform operations comprising:
      accessing, via a network, an email server to obtain a plurality of emails from an email inbox of the user;
      analyzing the plurality of emails to determine a set of deal emails from the plurality of emails that are related to deals;
      ranking the set of deal emails based on a set of relevance criteria associated with the user;
      generating a deal alert comprising a set of deal messages corresponding to the set of ranked deal emails, wherein each deal message in the set of deal messages comprises a hyperlink to the corresponding deal email in the set of ranked deal emails;
      providing, on a user device of the user, an interactive interface comprising a presentation of the deal alert, wherein the interactive interface is different from an email interface provided by the email server;
      detecting an interaction between the user and a first deal message on the interactive interface, wherein the first deal message corresponds to a first deal email; and
      in response to the detecting, automatically causing the first deal email to be removed from the email inbox of the user.

2. The system of claim 1, wherein the set of relevance criteria comprises at least one of a criterion related to a deal expiration date, a criterion related to an item category, a criterion related to a merchant location, a criterion related to a form of payment accepted by a merchant associated with a deal email, a criterion related to an amount of discount, or a criterion related to a relative position of the deal email with respect to other emails in the email inbox.

3. The system of claim 1, wherein the deal alert is transmitted to the user device as a text message or is presented on a service provider homepage of the user.

4. The system of claim 1, wherein the interaction between the user and the first deal message comprises selecting the hyperlink of the first deal message and using a deal associated with the first deal email.

5. The system of claim 4, wherein the operations further comprise processing a payment transaction associated with the deal.

6. The system of claim 1, wherein the interaction comprises deleting the deal alert comprising the hyperlink to the first deal email.

7. The system of claim 1, wherein the operations further comprise:
   detecting a second interaction between the user and a second deal message; and
   in response to detecting the second interaction, forwarding a second deal email corresponding to the second deal message to one or more contacts of the user.

8. The system of claim 1, wherein the operations further comprise causing the user device to light up or make a sound when the deal alert is transmitted to the user device.

9. A method of alerting a user of emails containing a deal comprising:
   accessing, by one or more hardware processors via a network, an email server to obtain a plurality of emails from an email inbox of the user;
   analyzing, by the one or more hardware processors, the plurality of emails to determine a set of deal emails that are related to deals and related to the user based on a set of relevance criteria;
   generating a deal alert comprising a set of deal messages corresponding to the set of deal emails, wherein each deal message in the set of deal messages comprises a hyperlink to the corresponding deal email;
   providing, on a user device of the user, an interactive interface comprising a presentation of the deal alert;
   receiving an indication, via the interactive interface, that the user is not interested in a first deal message corresponding to a first deal email; and
   in response to receiving the indication, automatically causing the first deal email to be removed from the email inbox of the user.

10. The method of claim 9, wherein the set of relevance criteria comprises at least one of a criterion related to a deal expiration date, a criterion related to an item category, a criterion related to a merchant location, a criterion related to a form of payment accepted by a merchant associated with a deal email, a criterion related to an amount of discount, or a criterion related to a relative position of the deal email with respect to other emails in the email inbox.

11. The method of claim 9, wherein the deal alert is transmitted to the user device as a text message or is presented on a service provider homepage of the user.

12. The method of claim 9, wherein the indication comprises the user deleting the first deal message from the deal alert.

13. The method of claim 9, further comprising processing a payment transaction in response to the user selecting the hyperlink of a second deal message and using a deal associated with the selected hyperlink.

14. The method of claim 9, further comprising causing the user device to light up or make a sound when the deal alert is presented on the user device.

15. A non-transitory machine-readable medium having stored thereon machine-readable instructions executable to cause a machine to perform operations comprising:
   accessing, via a network, an email server to obtain a plurality of emails from an email inbox of a user;
   analyzing the plurality of emails based on a set of relevance criteria to determine a set of deal emails related to deals that are relevant to the user;
   generating a deal alert comprising a set of deal messages corresponding to the set of deal emails, wherein each deal message in the set of deal messages comprises a hyperlink to the corresponding deal email in the set of deal emails;
   providing, on a user device of the user, an interactive interface comprising a presentation of the deal alert, wherein the interactive interface is different from an email interface provided by the email server;
   detecting an interaction between the user and a first deal message on the interactive interface, wherein the first deal message corresponds to a first deal email; and
   in response to the detecting, automatically causing the deal email to be removed from the email inbox of the user.

16. The non-transitory machine-readable medium of claim 15, wherein set of relevance criteria comprises at least one of a criterion related to a deal expiration date, a criterion related to an item category, a criterion related to a merchant location, a criterion related to a form of payment accepted by a merchant associated with a deal email, a criterion related to an amount of discount, or a criterion related to a position of the deal email with respect to other emails in the email inbox.

17. The non-transitory machine-readable medium of claim 15, wherein the deal alert is transmitted to the user device as a text message or is displayed on a service provider homepage of the user.

18. The non-transitory machine-readable medium of claim 15, wherein the operations further comprise processing a payment transaction in response to the user selecting the hyperlink of the first deal message and using a deal associated with the selected hyperlink.

19. The non-transitory machine-readable medium of claim 15, wherein the operations further comprise causing the user device to light up or make a sound when the deal alert is transmitted to the user device.

20. The system of claim 1, wherein the operations further comprise:
   determining, from the set of deal emails, a subset of deal emails having associated deals that are expired; and
   automatically removing the subset of deal emails from the email inbox of the user.

* * * * *